United States Patent [19]
Murphy

[11] 3,907,704
[45] Sept. 23, 1975

[54] NITROGEN-CONTAINING COMPOSITIONS USEFUL AS RUST INHIBITORS IN FUELS AND LUBRICANTS

[75] Inventor: John P. Murphy, Willoughby, Ohio

[73] Assignee: The Lubrizol Corporation, Cleveland, Ohio

[22] Filed: Apr. 25, 1973

[21] Appl. No.: 354,274

Related U.S. Application Data

[63] Continuation-in-part of Ser. No. 211,795, Dec. 23, 1971, abandoned, which is a continuation-in-part of Ser. No. 773,298, Nov. 4, 1968, abandoned.

[52] U.S. Cl. .................... 252/392; 44/71; 252/34; 252/51.5 A; 260/561 R
[51] Int. Cl............................................. C10m 1/32
[58] Field of Search................ 252/34, 51.5 A, 392; 44/71; 260/561 R

[56] References Cited
UNITED STATES PATENTS
1,926,015   9/1933   Rosenmund .................... 260/561 R
2,453,057   11/1948   Zienty ............................ 260/561 R

OTHER PUBLICATIONS

Noller, Chemistry of Organic Compounds, 1951, pages 238–239.

*Primary Examiner*—Patrick P. Garvin
*Assistant Examiner*—Andrew H. Metz
*Attorney, Agent, or Firm*—James W. Adams, Jr.; Daniel N. Hall

[57] ABSTRACT

This invention is directed to a nitrogen-containing composition and more specifically to a process for preparing a nitrogen-containing composition particularly useful as a rust-inhibitor for lubricants and fuels. The nitrogen-containing composition is prepared by reacting effective amounts of at least one alkylene amine with formic acid or a formic acid-producing compound at a temperature of at least about 25°C.

17 Claims, No Drawings

3,907,704

NITROGEN-CONTAINING COMPOSITIONS USEFUL AS RUST INHIBITORS IN FUELS AND LUBRICANTS

This application is a continuation-in-part of copending application Ser. No. 211,795 filed Dec. 23, 1971 now abandoned, which in turn is a continuation-in-part of Ser. No. 773,298 filed Nov. 4, 1968, now abandoned.

This invention relates to a nitrogen-containing composition and to a process for preparing said composition which is particularly useful as a rust-inhibitor for lubricants and fuels. More specifically, this invention relates to a rust-inhibiting nitrogen-containing composition and to the process for preparing same which comprises reacting at a temperature of at least about 25°C. an effective amount of at least one alkylene amine with formic acid and/or a formic acid-producing compound including, for example, the anhydride, salt, halide, ester, amide, etc., or a combination thereof. The nitrogen-containing composition may be used either alone or in combination with various other known additives, e.g., dispersants, detergents, anti-oxidants, etc., in lubricating oils, fuels, etc.

It is generally known that during the operation of an internal combustion engine, for example, the motor oil deteriorates causing the formation of sludge, varnish, rust, etc., which ultimately interfers with the normal operation of the engine causing a malfunction and premature breakdown. To avoid these and other related problems, various oil soluble dispersants, anti-oxidants, detergents and the like are being used as additives in lubricants, fuels, power-transmitting fuids, e.g., hydraulic fluids, etc. Although many of these materials have achieved widespread acceptance there still is need for additives which not only prevent deterioration but also inhibit corrosion and generally improve the performance characteristics of lubricants and fuels. Accordingly, it is an object of this invention to provide a nitrogen-containing composition which may be used as a rust-inhibitor for lubricants and fuels. It is another object of this invention to provide a process for preparing a nitrogen-containing composition which may be used as an additive to inhibit corrosion and generally improve the lubricating characteristics of lubricants. It is another object of this invention to provide a process and the products obtained therefrom for preparing an oil soluble nitrogen-containing composition which may be used as a rust-inhibitor either alone or in combination in normally liquid hydrocarbon fuels, lubricants, etc. It is still a further object of this invention to provide a process for preparing an oil soluble nitrogen-containing composition particularly effective, as a rust-inhibitor, at comparatively low temperatures.

These and other objects of the invention can be accomplished by providing a process for preparing an oil soluble nitrogen-containing composition for inhibiting rust and corrosion in lubricants and fuels. The process comprises contacting and reacting at a temperature of at least about 25°C. approximately 0.5 and less than 3.0 equivalents of at least one alkylene amine with about 1.0 equivalent of formic acid or a formic acid-producing compound. The formic acid-producing compounds that may be used for purposes of preparing the nitrogen-containing compositions of this invention includes various derivatives of formic acid capable of forming the acid, when reacted with one or more of the alkylene amines at a temperature of at least about 25°C. The formic acid-producing compounds particularly useful for purposes of this invention are selected from the class consisting of the anhydride of formic acid, salts of formic acid, halides of formic acid, esters of formic acid, amides of formic acid, imides of formic acid, amidines of formic acid and various combinations thereof in any proportion.

The salts of formic acid used in this invention are obtained by reacting an amine, e.g., a low molecular weight amine or ammonia with the acid at a temperature of at least about 25°C. and preferably at a temperature ranging from about 25°C. to about 120°C. More specifically, an ammonia or a lower alkyl ammonia salt of formic acid, e.g., wherein the alkyl group has 1 to 12 carbon atoms, and the corresponding low molecular weight amides, imides or amidines may be used to prepare the nitrogen-containing compositions for purposes of this invention. Similarly, useful esters of formic acid which can be reacted with the alkylene amines, e.g., polyethylene polyamines, are obtained by esterifying formic acid with a low molecular weight alcohol, e.g., an aliphatic alcohol having 1 to about 12 carbon atoms, preferably methanol. Similarly, the halides, e.g., a chloride or bromide, of formic acid can be used in place of formic acid or the anhydride thereof, etc. Also, amides of formic acid useful in this invention can be obtained by reacting a low molecular weight amine, e.g., an aliphatic amine having 1 to 12 carbon atoms, with formic acid or the anhydride thereof, etc., at temperatures ranging from about 80°C. up to about 300°C. to obtain the corresponding amide, imide, amidine or mixtures thereof depending upon the reaction conditions.

It is preferred, however, in preparing the oil soluble nitrogen-containing composition of this invention, to react the alkylene amine with either formic acid or a salt, ester or amide of formic acid. More specifically, preferred formic acid-producing compounds include the salts derived from either ammonia or a low molecular weight amine having up to 12 and preferably 1 to 8 carbon atoms. Preferred esters include those derived from lower molecular weight alkyl, cycloalkyl, aryl, alkylaryl or aralkyl alcohols wherein the number of carbon atoms range up to about 12 carbon atoms, preferably, from 1 to 8 carbon atoms. Similarly, preferred amides may be derived from various amines including alkyl, cycloalkyl, aryl, alkylaryl or aralkyl amines wherein the number of carbon atoms range up to about 12, preferably, from 1 to 8 carbon atoms. It is especially preferred, however, to use the lower molecular weight derivatives, e.g., volatile derivatives of formic acid so that the alkylene polyamines may react with said derivatives at the stated temperatures to obtain the nitrogen-containing composition by diplacing the volatile groups, e.g., the lower molecular weight amide, ester or salt groups, etc. The volatile constituents may be separated from the reaction mixture by methods known in the art and at temperatures utilized for preparing the products of this invention.

Specific examples of the various formic acid-producing compounds or derivatives that can be used include the ammonia salts, e.g., ammonia formate; the alkylammonia formates, e.g., methyl, ethyl, propyl, butyl formates, etc.; the esters of formic acid such as the lower alkyl esters, e.g., methyl formate, ethyl formate, propyl formate, butyl formate, octyl formate, etc. In addition, the amides include the amides derived from ammonia or the lower molecular weight alkyl amines such as formamide, dimethyl formamide, diethyl formamide, N-methyl formamide or other alkyl formamides wherein the alkyl group has from 1 to about 8 carbon atoms.

The nitrogen-containing compositions of this invention are prepared by contacting and reacting formic acid or at least one formic acid-producing compound with at least one alkylene amine, e.g., alkylene polyamines or a mixture of alkylene polyamines at a temperature of at least about 25°C., e.g., 25°C. to 120°C. and preferably at a temperature of at least about 100°C. However, the reaction temperature can range from about 25°C. to about 300°C. and preferably from about 100°C. to about 250°C. When utilizing a volatile formic acid-producing compound, such as methyl formate, ethyl formate, or an ammonia salt, etc., loss of the reagent may be avoided by a dropwise addition of the acid-producing compound to the alkylene amine.

The reaction may be carried out, preferably, in the presence of at least one substantially inert organic liquid which may be present in an amount ranging up to about 80% by weight of the total composition and preferably in an amount of about 10 to 50% by weight of the composition. These organic diluents or solvents are well known and include, for exaample, various organic liquids such as mineral oil, Stoddard Solvent, the aliphatic, cycloaliphatic and aromatic hydrocarbons, substituted hydrocarbons and the corresponding halogenated hydrocarbons. Specifically, the organic liquids comprise, for example, one or more solvents including a combination of mineral oil with one or more aliphatic, cycloaliphatic or aromatic hydrocarbons including kerosene, benzene, toluene, naphtha, xylene, ethyl benzene, propyl benzene, cumene, fluorobenzene, chlorobenzene, bromobenzene, toluene, heptene, octene, decane, trimethyl pentane, cyclohexane, cycloheptane, ethyl cyclohexane, cyclooctane, etc.

The alkylene amines, e.g., polyalkylene polyamines, which are used to obtain the nitrogen-containing compositions of this invention can be characterized by the formula:

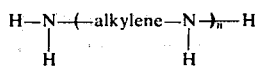

wherein $n$ ranges from 2 to about 10, preferably 2 to 6, and the alkylene radical is preferably a lower alkylene radical having less than about 10 carbon atoms, e.g., 2 to 8 carbon atoms. Specifically, the alkylene amines may include, for example, methylene amines, ethylene amines, butylene amines, propylene amines, pentylene amines, hexylene amines, heptylene amines, octylene amines, the polymethylene amines, the cyclic and higher homologs of these amines including, for example, the piperazines, the amino-alkyl-substituted piperazines, etc. The amines may be exemplified, further, to include triethylene tetramine, propylene diamine, decamethylene diamine, octamethylene diamine, di(heptamethylene)triamine, dipropylene tetramine, tetraethylene pentamine, trimethylene diamine, pentaethylene hexamine, di(trimethylene)triamine, etc. In addition, other amines which may be used, for example, include the higher homologs which may be prepared by condensing two or more of the above-mentioned alkyl amines in a conventional manner.

The ethylene amines are preferred and are described in detail under the heading "Ethylene Amines" in the Encyclopedia of Chemical Technology, by Kirk and Othmer, Volume 5, pages 898–905, Interscience Publishers, New York (1950). These compounds may be prepared conveniently by the reaction of an alkylene chloride with ammonia which may result in a mixture of alkylene amines including the cyclic condensation products such as the piperazines. The amine mixtures are particularly useful for purposes of this invention. In addition to the mixture of amines, the pure alkylene amines may be used also for purposes of this invention. For example, a particularly useful alkylene amine mixture, for reasons of economy as well as effectiveness of the products derived therefrom, comprises a mixture of ethylene amines prepared by the reaction of ethylene chloride with ammonia. This reaction results in an amine composition that corresponds to tetraethylene pentamine.

The amines, for purposes of this invention, may have primary, secondary, and if desired, some tertiary amine groups. The reaction of formic acid or its derivative with the tertiary amine groups will result in the formation of salts and it is not known if the remaining reaction takes place, preferentially, at the secondary or primary amine groups. However, the nitrogen-containing composition of this invention, will depend upon the alkylene amine used with the formic acid or its derivative and the conditions under which the reaction takes place, e.g., temperatures ranging from about 25° to 300°C. Thus, depending upon the reaction conditions, e.g., temperatures, etc., the resulting nitrogen-containing composition may comprise a salt, amide, imide, amidine, etc., and various mixtures thereof, all of which are useful as a rust-inhibitor for purposes of this invention.

In preparing the nitrogen-containing compositions, the formic acid or its derivative, e.g., a low molecular weight salt, amide or ester is reacted with the alkylene amine, e.g., polyethylene polyamine, at a temperature of at least about 25°C. and in an amount ranging from approximately 0.5 equivalent but less than 3.0 equivalents, preferably from approximately 1.0 to 2.5 equivalents of at least one alkylene amine for each 1.0 equivalent of formic acid or a derivative thereof. The equivalent weight of the alkylene amine is determined by the number of amine groups, and may be calculated, for example, by dividing the molecular weight of the amine by the number of amino groups. Similarly, the equivalent weight of formic acid or a formic acid-producing compound is determined by dividing the molecular weight by the number of acid or acid-producing groups present, e.g., the equivalent weight of formic acid is the same as its molecular weight.

The following examples illustrate the process and products obtained therefrom for preparing the nitrogen-containing compositions for purposes of this invention. Unless otherwise indicated, all reference to "percentages" or "parts" in these examples and elsewhere in the specification and claims is intended to refer to percent by weight and parts by weight, respectively.

EXAMPLE 1

Approximately 820 parts by weight (20 equivalents) of a commercial mixture of ethylene polyamines corresponding in stoichiometry to tetraethylene pentamine and having 34.2% nitrogen is added at a temperature of about 65°C. to approximately 460 parts by weight (10 equivalents) of formic acid. External cooling is applied to maintain the temperature between 65°–95°C. during the addition. The temperature is raised to about 150°C. and a slow stream of nitrogen is passed through the reaction mixture to aid the removal of water. The temperature is gradually raised to 160°C. and held there until the distillation of water has ceased. Approximately 1096 parts by weight of the product are obtained which has a nitrogen content of 25.3%.

EXAMPLE 2

To approximately 820 parts by weight of the commercial mixture of polyamines described in Example 1 is added to about 920 parts by weight (20 equivalents) of formic acid at a temperature of about 60°–85°C. The temperature is raised to about 120°C. and a slow stream of nitrogen is passed through the reaction mixture as the temperature is slowly raised to about 150°C. The reaction temperature is held at about 150°C. until the distillation of water has ceased. Approximately 1372 parts by weight of product are obtained which has a nitrogen content of about 19.7%.

EXAMPLE 3

Approximately 3.75 equivalents of a commercial polyethylene polyamine having an average composition corresponding to that of tetraethylene pentamine is heated to about 90°C. and then approximately 69 parts by weight (1.5 equivalents) of formic acid is slowly added to the reaction which raises the temperature to about 125°C. A slow stream of nitrogen is passed through the reaction mixture as the temperature raises to about 150°C. The reaction mixture is about 150°–160°C. until the distillation of water is completed. The resulting product is found to have a nitrogen content of about 22%.

EXAMPLE 4

Approximately 824 parts by weight (20 equivalents) of a commercial polyethylene polyamine having an average composition corresponding to that of tetraethylene pentamine is added to approximately 460 parts by weight (10 equivalents) of formic acid at about 78°–95°C. The reaction mixture is then heated to about 150°C. while a stream of nitrogen is passed through the mixture. The mixture is held at 150°–160°C. until the distillation of water is completed. Approximately 1102 parts by weight of product are obtained and found to have a nitrogen content of about 25.6%.

EXAMPLE 5

Approximately 824 parts by weight (20 equivalents) of the commercial mixture of polyamines described in Example 1 is added to about 920 parts by weight (20 equivalents) of formic acid at about 78°C. The reaction mixture is then held at 150°C. while a slow stream of nitrogen is passed through it. The reaction mixture is held at about 150°–158°C. until the distillation of the water is completed. Approximately 1239 parts by weight of product are obtained which has a nitrogen content of about 20%.

EXAMPLE 6

A reaction mixture comprising approximately 10 equivalents of a polyethylene pentamine and about 5 equivalents of an ammonia salt of formic acid is heated to about 65°–75°C. Subsequently, the reaction temperature is raised to about 150°C. while blowing with nitrogen to aid in the removal of by-product. The reaction temperature is gradually raised to about 160°–200°C. until the by-product is removed. Approximately 600 parts by weight of product are obtained.

EXAMPLE 7

A reaction mixture comprising an organic solvent together with about 40 equivalents of a polyalkylene tetramine and about 20 equivalents of a methyl ester of formic acid is heated to about 65°–75°C. The temperature is subsequently raised to about 150°C. while blowing with nitrogen to aid in the removal of by-product. The temperature is gradually raised to about 225°C. and held at this temperature until the removal of the by-product is completed. Approximately 2000 parts by weight of product are obtained.

EXAMPLE 8

A reaction mixture comprising approximately 4.0 equivalents of a polyalkylene tetramine and approximately 2.0 equivalents of formamide is heated to about 65°C. The temperature is subsequently increased to about 95°–100°C. and then to about 150°C. while blowing with nitrogen to aid in the removal of the by-product formed during the reaction. The temperature is gradually raised to about 200°C. and held until the removal of the by-product is completed. Approximately 200 parts by weight of product are obtained.

EXAMPLE 9

A reaction mixture comprising an organic diluent and approximately 10 equivalents of a polyethylene pentamine and approximately 12 equivalents of methyl-ammonium formate is heated to about 80°C. The temperature is subsequently raised to about 160°C. while blowing with nitrogen to aid in the removal of by-product formed during the reaction. The temperature is held at about 200°–220°C. until the removal of by-product has ceased. Approximately 550 parts by weight of product are obtained.

EXAMPLE 10

A reaction mixture comprising approximately 10 equivalents of a polyalkylene triamine and approximately 7.5 equivalents of an alkyl formamide is heated to about 80°C. The temperature is subsequently raised to about 180°C. while blowing with nitrogen to aid in the removal of the by-product formed during the reaction. The temperature of the reaction is held at about 180°C. until the removal of the by-product has ceased. Approximately 700 parts by weight of product are obtained.

The nitrogen-containing compositions of this invention can be used as additives, e.g., particularly as rust-inhibiting compositions in various hydrocarbon fuels including, for example, gasolines, diesel fuels, furnace oils and other normally liquid petroleum distillates. In addition, the nitrogen-containing compositions are useful as additives for lubricating compositions including a diverse number of oils of lubricating viscosity such as the natural or synthetic lubricating oils. More specifically, the nitrogen-containing compositions of this invention can be used as additives to improve the rust-inhibition of various lubricants, used in spark-ignited and combustion-ignited internal combustion engines such as the automobile and truck engines, two-cycle engines, aviation piston engines, marine and railroad diesel engines and the like. In addition, various automatic transmission fluids, trans-axle lubricants, gear lubricants, metal-working lubricants, hydraulic fluids and similar lubricating oil-containing and grease compositions can be improved by the incorporation therein of small but effective amounts of the nitrogen-containing compositions of this invention.

More specifically, the nitrogen-containing additives of this invention can be used in various lubricating oils and fuels in amounts ranging from about 0.0001% up to about 25 or 30% by weight of the total composition. Preferably, however, the nitrogen-containing compositions can be used in amounts ranging from about 0.001 to about 20% or 0.01 to about 20% by weight in various lubricants, e.g., mineral oils, and from about 0.0001 to about 2.0% or 0.001 to about 1.0% by weight in various fuels. The optimum amount to be added to a particular oleaginous material, however, will depend upon the conditions the fuel or lubricant is to be subjected. More specifically, for example, if the nitrogen-containing additives are to be used in a fuel or oil for an internal combustion engine, the amount may range from about 0.001 to about 1.0% by weight and usually in amounts ranging from about 0.03 to 0.5% by weight or in amounts ranging from about 0.005 to about 0.008% by weight.

The following examples illustrate the use of the nitrogen-containing compositions of this invention as additives for lubricants and fuels.

EXAMPLE A

SAE 30 mineral lubricating oil is blended with sufficient carbonated basic calcium salt of a $C_{14}$–$C_{18}$ alkyl salicyclic acid to give the oil a sulfated ash of 0.165%, sufficient zinc salt of phosphorothioic acid prepared by the reaction of 1 mole of phosphorus pentasulfide with a mixture of 2.6 moles of isobutyl alcohol and 1.4 moles of primary amyl alcohol to give the oil a phosphorus content of 0.77%, 1.69% of the amide of polyisobutenyl (average molecular weight of about 850) succinic acid and tetraethylene pentamine and 34 parts per million of the product obtained described in Example 3.

EXAMPLE B

SAE 10W-40 mineral lubricating oil is blended with 2.94% by weight of a composition prepared by reacting polyisobutenyl (average molecular weight of 850) succinic anhydride with the reaction product of 2 moles of (hydroxyethyl) ethylene diamine with 1.0 mole of adipic acid, 0.575% by weight of a carbonated basic calcium salt of a polydodecyl benzene sulfonic acid and 60 parts per million of the product described in Example 3.

EXAMPLE C

Gasoline for an internal combustion engine is blended with 0.005% by weight of the product described in Example 3.

EXAMPLE D

A diesel fuel is blended with approximately 1.0% by weight of the product described in Example 1.

EXAMPLE E

A fuel containing kerosene is blended with approximately 2.0% by weight of the product described in Example 2.

EXAMPLE F

A hydraulic fluid containing mineral lubricating oil is blended with approximately 0.1% by weight of the product described in Example 4.

In addition to the nitrogen-containing compositions of this invention it is obvious that other known additives may be used either alone or in combination in the lubricants and fuels. These additives include, for example, detergents of the ash-containing type, dispersants of the ashless-containing type, viscosity index improving agents, pour-point depressing agents, anti-foam agents, extreme-pressure agents, other rust-inhibiting agents, oxidation and corrosion inhibiting agents and various mixtures of these materials in various proportions as illustrated, for example, in U.S. Pat. Nos. 3,381,002; 3,509,052; 3,272,746; 3,172,892; 3,374,174; etc. More particularly, the ash-containing detergents are illustrated by the oil soluble neutral and basic salts of the alkali or alkaline earth metals of the sulfonic acids, carboxylic acids or the organic phosphorus acids. An additive can be prepared, for example, by the reaction of an olefin polymer, e.g., polyisobutene, having a molecular weight of about 2000 with a phosphorizing agent including, for example, phosphorus trichloride, phosphorus heptasulfide, phosphorus pentasulfide, phosphorus trichloride and sulfur, white phosphorus and a sulfur halide or phosphorothioic chloride. The compositions most commonly used, however, are the salts of sodium, potassium, lithium, calcium, magnesium, strontium, barium and various mixtures thereof.

The aforesaid basic salts can be prepared by heating a mineral oil solution of the acid with a stoichiometric excess of a metal neutralizing agent, e.g., a metal oxide, hydroxide, carbonate, bicarbonate, sulfide, etc., at temperatures above about 50°C. In addition, various promoters can be used in the neutralizing process to aid in the incorporation of the excess of metal. These promoters include compounds such as phenolic compounds, e.g., phenols, naphthols, alkyl-phenols, thiophenols, sulfurized alkylphenols; various condensation products of formaldehyde with the phenolic compounds, e.g., alcohols such as methanol, 2-propanol, octyl alcohol, cellosolve, carbitol, ethylene glycol, stearyl alcohol and cyclohexyl alcohol; amines such as aniline, phenylene-diamine, phenothiazine, phenyl-beta-naphthylamine and dodecyl amine, etc. A particularly effective process for preparing the basic salts comprises mixing the acid with an excess of the alkaline earth metal in the presence of the phenolic promoter and a small amount of water and carbonating the mixture at an elevated temperature, e.g., 60°C. to about 200°C.

The extreme pressure agents, corrosion-inhibiting and oxidation inhibiting agents are exemplified by the chlorinated aliphatic hydrocarbons such as chlorinated wax; organic sulfides and polysulfides such as benzyl disulfide, bis(chlorobenzyl) disulfide, dibutyl tetrasulfide, sulfurized sperm oil, sulfurized methyl ester of oleic acid, sulfurized alkylphenol, sulfurized dipentene, sulfurized terpene, etc.; phosphosulfurized hydrocarbons such as the reaction product of a phosphorus sulfide with turpentine or methyl oleate; phosphorus esters including principally dihydrocarbon and trihydrocarbon phosphites such as dibutyl phosphite, diheptyl phosphite, dicyclohexyl phosphite, pentyl phenyl phosphite, dipentyl phenyl phosphite, tridecyl phosphite, distearyl phosphite, dimethyl naphthyl phosphite, oleyl-4-pentyl phenyl phosphite, polypropylene (molecular weight 500)-substituted phenyl phosphite, diisobutyl substituted phenyl phosphite; metal thiocarbamates such as zinc dioctyldithiocarbamate and barium heptylphenyl dithiocarbamate; Group II metal phosphorodithioates such as the barium, calcium, cadmium and zinc dicyclohexylphosphorodithioate, zinc dioctylphosphorodithioate, the zinc salt of a phosphorodithioic acid produced by the reaction of phosphorus pentasulfide with an equimolar mixture of isopropyl alcohol and n-hexyl alcohol, etc.

The fuel or lubricating compositions of this invention can contain other metal detergent additives in amounts ranging from about 0.001 to about 15% by weight. In some applications, e.g., in lubricating marine diesel engines, the lubricating compositions may contain as much as 30% of a detergent additive. The compositions, e.g., lubricants or fuels, etc., can contain extreme pressure agents, viscosity-index improving agents, pour-point depressing agents, etc., each in amounts within the range of from about 0.001 to 15% and preferably in amounts of 0.1 to about 10%. One or more of the above-mentioned additives may be used either alone or in combination in various compositions, e.g., fuels or lubricating oils, with about 0.0001 to about 30% by weight of the compositions of this invention.

The oleaginous materials used in making the lubricating compositions of this invention, include animal and vegetable oils, e.g., castor oil, lard oil, etc., as well as solvent-refined or acid-refined mineral lubricating oils of the paraffinic, naphthenic or mixed paraffinic-naphthenic types. Oils of lubricating viscosity derived from coal or shale are useful base oils. The synthetic lubricating oils include the hydrocarbon oils and halo-substituted hydrocarbon oils such as polymerized and interpolymerized olefins (e.g., polybutylenes, propylene-isobutylene copolymers, chlorinated polybutylenes, etc.); alkylbenzenes (e.g., dodecylbenzene, tetradecyl benzene, dinonylbenzene, di-(2-ethylhexyl) benzene, etc.); polyphenyls (e.g., biphenyls, terphenyls, etc.) and the like. The alkylene oxide-polymers and interpolymers and derivatives thereof where the terminal hydroxyl groups have been modified by esterification, etherification, etc., comprise another class of known synthetic lubricating oils. These are exemplified by the oils prepared by polymerization of ethylene oxide, propylene oxide, the alkyl and aryl ethers of these polyoxyalkylene polymers, e.g., methyl-polyisopropylene glycol ether having an average molecular weight of 1000, diphenyl ether of polyethylene glycol having a molecular weight of 500 to 1000, diethyl ether of polypropylene glycol having a molecular weight of 1000 to 1500, etc., or mono- and polycarboxylic esters thereof, for example, the acetic acid esters, mixed $C_3$–$C_8$ fatty acid esters or the $C_{13}$Oxo acid diester of tetraethylene glycol, etc.

Other synthetic lubricating oils comprise the esters of dicarboxylic acids (e.g., phthalic acid, succinic acid, maleic acid, azelaic acid, suberic acid, sebacic acid, fumaric acid, adipic acid, linoleic acid dimer, etc.) with a variety of alcohols (e.g., butyl alcohol, hexyl alcohol, dodecyl alcohol, 2-ethylhexyl alcohol, pentaerythritol, etc.). Specific examples of these esters include dibutyl adipate, di(2-ethylhexyl)-sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, the complex ester formed by reacting one mole of sebacic acid with two moles of 2-ethylhexanoic acid and the like. Esters and mixtures of esters of polyhydric alcohols such as trimethylol propane, pentaerythritol, dipentaerythritol, etc. with lower fatty acids, e.g., those containing 4 to 12 carbons, can also be used as base oils in the lubricating compositions of this invention.

Silicone-based oils such as the polyalkyl-, polyaryl-, polyalkoxy- or polyaryloxy- siloxane oils and silicate oils comprise another class of synthetic lubricants (e.g., tetraethyl-silicate, tetraisopropyl-silicate, tetra-(2-ethylhexyl)-silicate, tetra-(4-methyl-2-tetraethyl)-silicate, tetra-(p-tert-butylphenyl)-silicate, hexyl-(4-methyl-2-pentoxy)-disiloxane, poly(methyl)disiloxanes, poly-(methylphenyl)-siloxanes, etc.). Other synthetic lubricants include the liquid esters of phosphorus-containing acids (e.g., tricresyl phosphate, trioctyl phosphate, diethyl ester of decane phosphonic acid, etc.), polymeric tetrahydrofurans and the like.

While this invention is described with a number of specific embodiments, it is obvious that there are other variations and modifications which can be made without departing from the spirit and scope of the invention as particularly set forth in the appended claims.

What is claimed is:

1. A nitrogen-containing composition for inhibiting rust in lubricants and fuels prepared by reacting at a temperature of at least about 25°C. approximately 0.5 and less than 3.0 equivalents of at least one alkylene amine of the formula

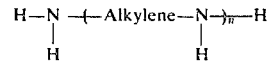

wherein $n$ ranges from 2 to about 10 and the alkylene radical has less than 10 carbon atoms with about 1.0 equivalents of formic acid or a formic acid-producing compound selected from the class consisting of anhydride of formic acid, formic acid salts of ammonia and $C_{1-12}$ alkyl amines, halides of formic acid, formic acid esters of $C_{1-12}$ aliphatic alcohols, formic acid amides, imides and amidines of ammonia and $C_{1-12}$ alkyl amines and combinations of formic acid with said formic acid-producing compounds.

2. The nitrogen-containing composition of claim 1 further characterized in that the temperature is at least about 100°C.

3. The nitrogen-containing composition of claim 1 further characterized in that the temperature ranges from about 25° to about 300°C.

4. The nitrogen-containing composition of claim 3 further characterized in that the temperature ranges from about 25°10 to about 120°C.

5. The nitrogen-containing composition of claim 1 further characterized in that the alkylene amine is reacted with formic acid.

6. The nitrogen-containing composition of claim 1 further characterized in that the alkylene amine is reacted with formic acid-producing compound selected from the class consisting of salts of formic acid, esters of formic acid and amides of formic acid.

7. The nitrogen-containing composition of claim 6 further characterized in that the alkylene amine is reacted with a salt of formic acid made from ammonia or an alkyl amine of 1 to 12 carbon atoms.

8. The nitrogen-containing composition of claim 6 further characterized in that the salt is an amine salt of formic acid having 1 to 8 carbon atoms.

9. The nitrogen-containing composition of claim 6 further characterized in that the alkylene amine is reacted with an ester of formic acid made from an aliphatic alcohol having 1 to 12 carbon atoms.

10. The nitrogen-containing composition of claim 9 further characterized in that the ester of formic acid is of an alcohol having 1 to 8 carbon atoms.

11. The nitrogen-containing composition of claim 6 further characterized in that the alkylene amine is reacted with a low molecular weight amide of formic acid.

12. The nitrogen-containing composition of claim 10 further characterized in that the ester is a methyl ester of formic acid.

13. The nitrogen-containing composition of claim 11 further characterized in that the amide is an alkyl formamide.

14. The nitrogen-containing composition of claim 13 further characterized in that the alkyl formamide has an alkyl group of 1 to 8 aliphatic carbon atoms.

15. The nitrogen-containing composition of claim 1 further characterized in that the alkylene radical is ethylene.

16. The nitrogen-containing composition of claim 1 further characterized in that the alkylene amine comprises a mixture of alkylene polyamines.

17. The nitrogen-containing composition of claim 1 further characterized in that the alkylene radical has 2 to 8 carbon atoms.

* * * * *

UNITED STATES PATENT OFFICE
CERTIFICATE OF CORRECTION

PATENT NO. : 3,907,704
DATED : September 23, 1975
INVENTOR(S) : John P. Murphy

It is certified that error appears in the above-identified patent and that said Letters Patent are hereby corrected as shown below:

At column 10, line 58, that is Claim 3, line 3, "25°" should be -- 25°C. --.

At column 10, line 61, that is Claim 4, line 3, "25°10" should be -- 25°C. --.

Signed and Sealed this sixth Day of January 1976

[SEAL]

Attest:

RUTH C. MASON
Attesting Officer

C. MARSHALL DANN
Commissioner of Patents and Trademarks